(12) United States Patent
Okamoto et al.

(10) Patent No.: US 6,759,811 B2
(45) Date of Patent: Jul. 6, 2004

(54) LIGHT SOURCE DEVICE

(75) Inventors: Masashi Okamoto, Hyogo (JP);
Tomohiro Yamamoto, Hyogo (JP);
Minoru Fukuda, Hyogo (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/193,174

(22) Filed: Jul. 12, 2002

(65) Prior Publication Data
US 2003/0011320 A1 Jan. 16, 2003

(30) Foreign Application Priority Data
Jul. 13, 2001 (JP) ........................................ 2001-213714

(51) Int. Cl.[7] ............................................. H05B 37/02
(52) U.S. Cl. ..................... 315/291; 315/307; 313/238
(58) Field of Search ........................... 315/76, 78, 224, 315/209 R, 291, 307, 241 R, 362, 219, DIG. 4; 313/238

(56) References Cited

U.S. PATENT DOCUMENTS

| | | | | |
|---|---|---|---|---|
| 3,886,405 A | * | 5/1975 | Kubo ......................... 315/224 |
| 4,574,219 A | * | 3/1986 | Davenport et al. ........... 315/49 |
| 6,239,551 B1 | * | 5/2001 | Park ............................ 315/78 |
| 6,605,906 B2 | * | 8/2003 | Okamoto et al. ........... 315/291 |
| 2002/0047610 A1 | | 4/2002 | Arimoto et al. | |
| 2002/0130626 A1 | * | 9/2002 | Okamoto et al. ........... 315/219 |
| 2004/0051431 A1 | * | 3/2004 | Murr et al. ................. 313/238 |

FOREIGN PATENT DOCUMENTS

EP   1 134 784 A2   9/2001

* cited by examiner

Primary Examiner—James Clinger
Assistant Examiner—Jimmy T. Vu
(74) Attorney, Agent, or Firm—Nixon Peabody LLP; David S. Safran

(57) ABSTRACT

A light source device with a mercury lamp, in the case of formation of a bridging short circuit of the gap between the electrodes of the discharge lamp caused by mercury, to prevent the light source device from no longer being usable because the difference between a defective device and one with such a bridging short circuit cannot be ascertained, has a means for determining that a bridging short circuit has formed in the gap between the electrodes. Furthermore, various manners for eliminating the bridging short circuit are provided including those that make use of vibration, heat, dielectric discharge or Lorenz forces.

14 Claims, 7 Drawing Sheets

LIGHT SOURCE DEVICE

BACKGROUND OF THE INVENTION

1. Field of the Invention

The invention relates to a light source device using a high pressure mercury discharge lamp which is used, for example, as a light source for a projector.

2. Description of the Prior Art

In a light source device for an optical device, such as a liquid crystal projector, a DLP® projector (Texas Instruments) or the like, a discharge lamp with high radiance (HID lamp) is used. However, recently, more and more often there has been a need for a larger amount of mercury to be added to the discharge lamp than in the conventional case, in order to make the above described optical device more radiant.

Furthermore, since the degree of utilization of the light emitted from the discharge lamp becomes greater, the more the light source approaches a point light source, there is more and more a demand for reducing the distance between the electrodes of the discharge lamp in order to make the discharge emission area of the lamp smaller.

However, if the amount of mercury to be added is increased and the distance between the electrodes is reduced, the phenomena occurs that, when the lamp is turned off and when the temperature drops as a result, the vaporized mercury condenses on the electrodes as liquid and the gap between the electrodes, as the two poles, is bridged, or there is the phenomenon that the mercury, due to vibration during transport of the device or the like, enters the gap between the electrodes and bridges it even if the mercury has not been liquified by condensation.

When this phenomenon occurs, the gap between the electrode is short-circuited by the mercury. Therefore, there is the disadvantage that a discharge cannot occur between the electrodes and that the lamp can no longer be operated. If the feed device does not have a protective function against the current exceeding a certain value, there is also the disadvantage that the feed device is damaged due to the current exceeding a certain value.

In the case of a feed device with a protective function against the current exceeding a certain value, damage is prevented. However, since the operator of the device cannot know that such a phenomenon has occurred, there is the disadvantage that the device is considered defective even if the device can be used in practice by eliminating the bridging short circuit by eliminating the mercury which is bridging the gap between the electrodes by gently striking the lamp or the device.

SUMMARY OF THE INVENTION

A primary object of the present invention is to eliminate the disadvantage that exists in the prior art that it cannot be determined whether or not a light source device with a mercury lamp is defective when a bridging short circuit of the gap between the electrodes of the discharge lamp is caused by mercury, so that the light source device can no longer be used once such occurs.

In a first aspect of the invention, in a light source device in which the following components are connected to one another:
  a discharge lamp in which a pair of electrodes are arranged oppositely; and
  a feed device for supplying a discharge current to the electrodes for the main discharge;
the object is achieved in that the light source device has the following functions:
  the function of determining that a bridging short circuit in the gap between the electrodes of the discharge lamp by mercury has occurred; and
  the function of displaying that the formation of a bridging short circuit by the mercury has occurred.

In a second aspect of the invention, in a light source device in which the following components are connected to one another;
  a discharge lamp in which a pair of electrodes are arranged oppositely; and
  a feed device for supplying a discharge current to the electrodes for the main discharge;
the object is achieved in that the light source device has the function of determining the occurrence of a bridging short circuit in the gap between the electrodes of the discharge lamp by mercury and that the light source device has a means for eliminating the bridging short circuit which is used to eliminate the bridging short circuit caused by the mercury.

The object is achieved in a development of the invention in that, in the version according to the second aspect of the invention, the means for eliminating the bridging short circuit is a means which applies a vibration or an impact to the discharge lamp.

The object is furthermore achieved preferably in that, in the version according to the second aspect of the invention, the means for eliminating the bridging short circuit is a means which heats the lamp.

The object is moreover feasibly achieved in that, in the invention described in the paragraph above, in the means for eliminating the bridging short circuit, there is an auxiliary electrode in addition to the electrodes for the main discharge, so that a discharge can form between the auxiliary electrode and one of the electrodes for the main discharge.

The object is advantageously achieved furthermore in that, in the version according to the second aspect of the invention, the means for eliminating the bridging short circuit applies a magnetic field to the gap between the electrodes, and moreover, supplies a current to the mercury which is causing the bridging short circuit and that, in this way, the mercury which causes the bridging short circuit is moved by a Lorentz force which acts on the mercury.

The invention is further described below using several embodiments shown in the drawings.

DETAILED DESCRIPTION OF THE INVENTION

Figure 1:
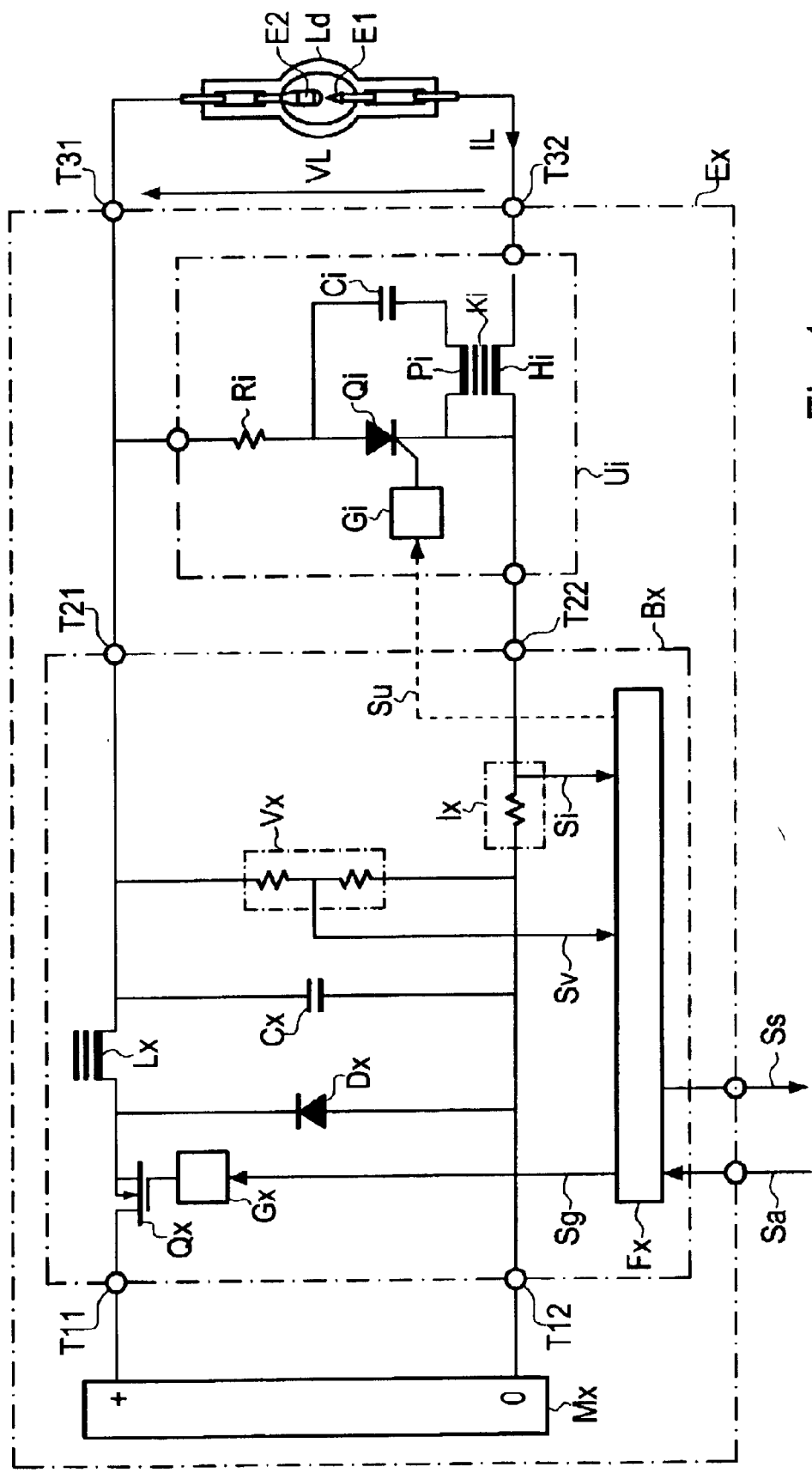
FIG. 1 is a schematic of the arrangement of a light source device in accordance with the invention.

FIG. 1 shows a simplified representation of one example of an arrangement of a light source device according to the invention in which a discharge lamp (Ld) is discharged by applying a DC voltage. In the feed device (Ex), a ballast circuit (Bx) of the voltage reduction chopper type is operated by supplying a voltage via terminals (T11, T12) from a DC source (Mx), such as a power factor corrector (PFC) or the like. In the ballast circuit (Bx), using a switching device (Qx), such as a FET or the like, the current from the DC source (Mx) is turned on or off, and a smoothing capacitor (Cx) is charged via a choke (Lx). This voltage is applied via terminals (T21, T22) and terminals (T31, T32) to the discharge lamp (Ld), by which a current can flow in the discharge lamp (Ld).

During the interval during which the switching device (Qx) is in the ON state, the smoothing capacitor (Cx) is charged and current is supplied directly to the discharge lamp (Ld) as a load by the current through the switching device (Qx) and energy in the form of a current is stored in the choke (Lx). During the interval during which the switching device (Qx) is in the OFF state, the smoothing capacitor (Cx) is charged by the energy stored in the choke (Lx) in the form of current via a fly-wheel diode (Dx) and current is supplied to the discharge lamp (Ld).

In the starter (Ui), a capacitor (Ci) is charged via the resistor (Ri) by the lamp voltage (VL). When the gate driver circuit (Gi) is activated, a switching device (Qi) which is comprised of a thyristor or the like is closed. In this way, the capacitor (Ci) is discharged via the primary winding (Pi) of a transformer (Ki), and a high voltage pulse is formed on the secondary winding (Hi).

The high voltage which has formed on the secondary winding (Hi) of the starter (Ui) is superimposed by the output voltage of the ballast circuit (Bx) and is applied between the electrodes (E1, E2). Thus, in the gap between the electrodes (E1, E2) of the discharge lamp, an insulation breakdown can be produced and the discharge can be started.

A feed control circuit (Fx) produces a gate driver signal (Sg) which has a certain pulse duty factor and which is supplied to the gate terminal of the switching device (Qx) via the gate driver circuit (Gx). In this way, turning the current from the DC source (Mx) on and off is controlled. The lamp current (IL) which flows between the electrodes (E1, E2) of the discharge lamp (Ld) and the lamp voltage (VL) which forms between the electrodes (E1, E2) can be determined by a current determination part (Ix) and a voltage determination means (Vx). The current determination means (Ix) can be easily implemented using a shunt resistance and the voltage determination means (Vx) using a partial pressure resistance.

A lamp current signal (Si) from the current determination means (Ix) and a lamp voltage signal (Sv) from the voltage determination means (Vx) are input into the feed control circuit (Fx). Based on the difference between the discharge states of the discharge lamp (Ld) at this instant, i.e., whether the discharge lamp (Ld) is in the non-discharging state, in the glow discharge state, or in the arc discharge state, the pulse duty factor of the gate driver signal (Sg) is feedback-controlled such that the lamp current (IL) and the lamp voltage (VL) or the lamp wattage as the product of this current and this voltage has a reduced difference from its setpoint.

The advantage of the invention according to its first aspect is described below. As the first step of the operating sequence in lamp operation, because the feed device (Ex) receives an operation guidance signal (Sa) from the outside, for example, from the main part of an optical device, such as a projector or the like, a voltage of, for example, roughly 300 V to 1000 V is applied, called the "no-load voltage." After its termination, the starter (Ui) is operated, by which a discharge is started. After starting the discharge, finally, in general via a glow discharge with a limited time or a temporary arc discharge, a transition to an arc discharge by thermionic emission is carried out.

When the no-load voltage forms, the feed device (Ex) controls the switching device (Qx) such that the lamp voltage signal (SV) agrees with the setpoint which corresponds to the no-load voltage of the lamp.

However, in the case in which the bridging short circuit of the gap between the electrodes (E1, E2) of the discharge lamp (Ld) is formed by the mercury, the lamp voltage (VL) does not increase, but is kept at roughly 0 V. The lamp voltage signal (Sv) is far below the setpoint and cannot reach it.

In this case, a large lamp current flows and the lamp current signal (Si) becomes large. Therefore, the upper boundary value Ilmax of the lamp current (IL) and the corresponding upper boundary value of the lamp current signal (Si) are established. When the lamp current signal (Si) tries to exceed this boundary value of the lamp current signal (Si), generally control is exercised such that the pulse duty factor of the gate driver signal (Sg) is reduced. This prevents damage to the feed device (Ex) even if a short circuit forms between the electrodes (E1, E2) of the discharge lamp (Ld).

In the case of establishing that the lamp voltage signal (Sv), in this way, shows only a low voltage which corresponds to a short circuit between the electrodes (E1, E2), when the feed device (Ex) tries to produce the no-load voltage, the feed control circuit (Fx) is arranged such that the bridging short circuit in the gap between the electrodes (E1, E2) of the discharge lamp (Ld) caused by the mercury has been determined.

In the case of determining a bridging short circuit has been caused by the mercury, this circumstance is displayed by a means for information delivery, such as a buzzer tone or operation of an emission element, such as a LED lamp or the like. The "display" here also includes transmission of a signal from the light source device of the invention to the outside, i.e., a bridging short circuit signal (Ss).

If, for example, the main part of the optical device, such as a projector or the like, receives the bridging short circuit signal (Ss) from the feed control circuit (Fx), display can be carried out by the information delivery means for indicating the formation of the bridging short circuit by the mercury to the operator, such as by operation of an emission element, e.g., a LED lamp or the like, also by the main part of the optical device.

By arranging the light source device in the above described manner, in the light source device of the invention, it is displayed to the outside that the bridging short circuit caused by the mercury has formed, and although a bridging short circuit forms between the electrodes (E1, E2) of the discharge lamp (Ld) caused by the mercury, the light source device is not damaged. Thus, suitable treatment can be carried out, and as a result, it is possible to contribute to returning the device to the normal state.

The arrangement according to the invention, in the above described area, can contribute to returning the device to the normal state. However, intervention by the operator is necessary. However, in one development of the invention, the device can be automatically returned to the normal state without the need for intervention by the operator by the measure that the light source device determines the bridging short circuit in the gap between the electrodes (E1, E2) of the discharge lamp (Ld) caused by the mercury, that it has a means for eliminating the bridging short circuit and that the means for eliminating the bridging short circuit is operated when a bridging short circuit is determined.

To implement the above described arrangement for determining the bridging short circuit in the gap between the electrodes (E1, E2) of the discharge lamp (Ld) caused by the mercury, of course, the above described arrangement for determining the bridging short circuit in the gap between the electrodes (E1, E2) of the discharge lamp (Ld) caused by the mercury can be used.

In practical use of the above described means for eliminating the bridging short circuit, the above described means is installed, for example, in the main part of the optical device, such as a projector or the like. The invention also develops its advantage effectively when the optical device is arranged, in the same manner as described above, specifically such that the main part of the optical device, when receiving signals from the light source device of the invention, i.e., the bridging short circuit determination signal (Ss), start operation of the above described means for eliminating the bridging short circuit.

Another aspect of the invention is described below.

Here, the device applies a vibration or an impact to the discharge lamp (Ld). Therefore, the mercury with its high specific weight which is located in the gap between the electrodes (E1, E2) of the discharge lamp (Ld) in the bridging short circuit state according to the law of inertia can be sprayed out of the gap between the electrodes (E1, E2), can be moved thereby and thus the bridging short circuit can be eliminated skillfully, and moreover, with high efficiency.

When a vibration or impact is applied to the discharge lamp (Ld), it is effective to apply a vibration or impact in the direction which is essentially perpendicular to the axial direction between the electrodes (E1, E2).

Furthermore, the advantage of the invention is also effectively developed by the fact that, when a vibration or an impact is applied to the discharge lamp (Ld), not only is a vibration or an impact applied directly to the discharge lamp (Ld), but that, for example, a vibration or an impact is applied to the reflector or the lamp housing and the like in which the discharge lamp (Ld) is held, and consequently, a vibration or an impact is also applied to the discharge lamp (Ld).

Another embodiment of the invention is described below.

Here, the device heats the discharge lamp (Ld). The mercury which is located in the gap between the electrodes (E1, E2) of the discharge lamp (Ld) in the bridging short circuit state can vaporize, and thus, the bridging short circuit can be eliminated skillfully and moreover with high efficiency.

Figure 2:
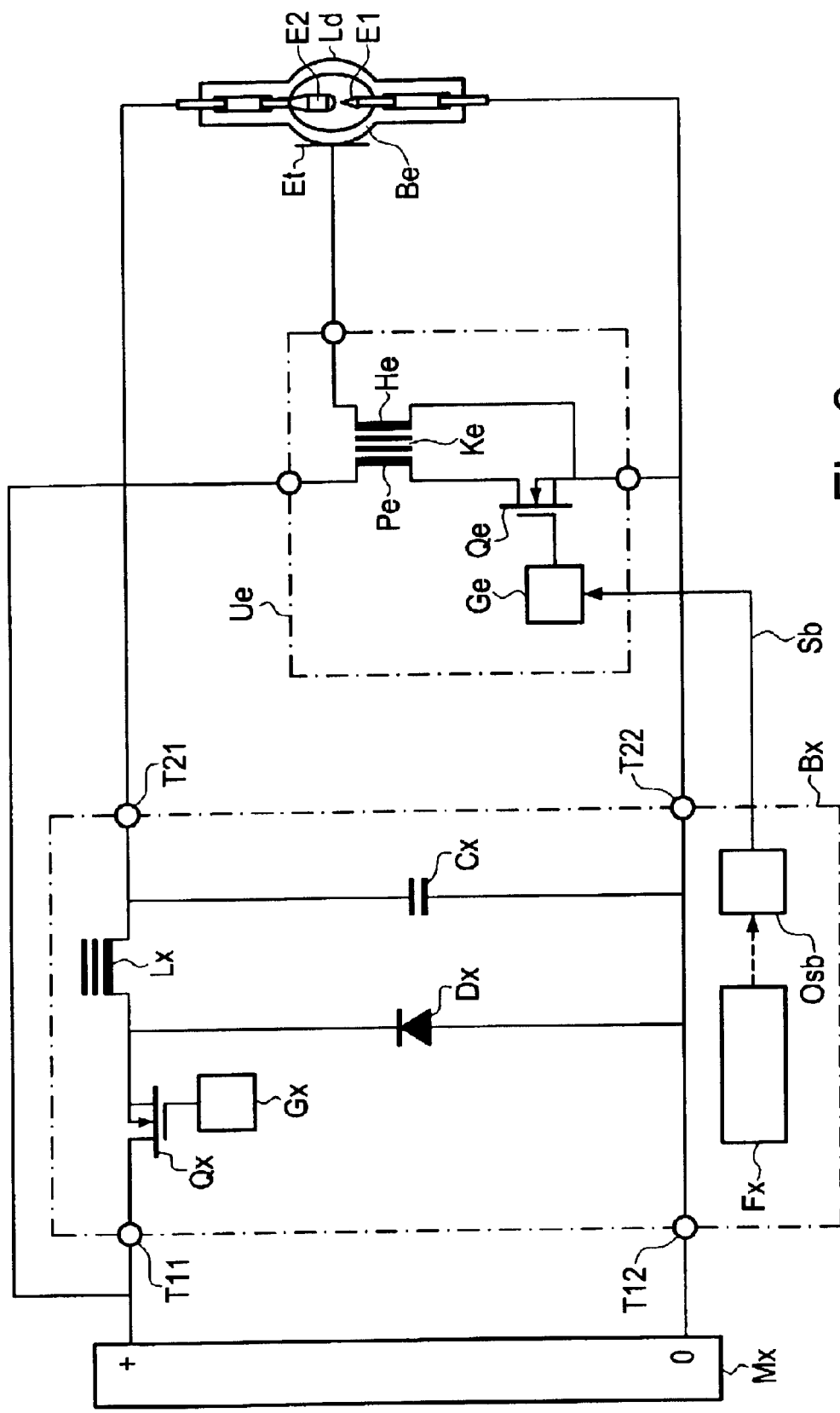
FIG. 2 is a schematic of another arrangement of a light source device in accordance with the invention.

In another development of the invention, which is described using FIG. 2, in addition to the electrodes (E1, E2) for the main discharge, an auxiliary electrode (Et) is located bordering the outside of the lamp bulb (Be) of the discharge lamp (Ld). A high voltage is applied by the auxiliary electrode feed circuit (Ue) to between one of the electrodes (E1, E2) forming the poles for the main discharge and the auxiliary electrode (Et).

By this arrangement, in the discharge space within the discharge lamp (Ld), a discharge can be produced by the dielectric barrier discharge, even if the above described electrodes (E1, E2) for the main discharge are subjected to a bridging short circuit by the mercury.

A dielectric barrier discharge is a discharge in which a strong electrical field is applied by a pair of electrodes via a dielectric to the discharge space and in which thus an insulation breakdown is produced in the gas in the discharge space.

In this aspect of the invention, a discharge is formed, via the glass of the lamp bulb (Be), between the electrodes (E1, E2) for the main discharge which are connected by the mercury bridging short circuit, and the inside of the glass of the lamp bulb (Be). Therefore, regardless of whether or not a bridging short circuit has formed between the electrodes (E1, E2) for the main discharge due to mercury, a discharge can be produced. However, to maintain a dielectric barrier discharge, the voltage which is to be applied to the electrodes must be a pulse series or an AC voltage.

This discharge heats up the discharge lamp (Ld). The mercury which is located in the gap between the electrodes (E1, E2) of the discharge lamp (Ld) in the bridging short circuit state can therefore be vaporized, and thus, the bridging short circuit can be eliminated skillfully and moreover with high efficiency.

Furthermore, since a dielectric barrier discharge can be produced by applying a high voltage between the auxiliary electrode (Et) and one of the electrodes (E1, E2), without using the starter (Ui) described above relative to FIG. 1, the main discharge can be immediately induced between the two poles, electrodes (E1, E2), if a bridging short circuit has not been caused by the mercury in the gap between the electrodes (E1, E2) and it can be induced after eliminating the bridging short circuit when the bridging short circuit is formed by the mercury, the dielectric barrier discharge acting as an initiator.

Therefore, in a development of the light source device, the means for eliminating the bridging short circuit also acts as a starter. As a result, the starter (Ui) described above using FIG. 1 need not be included. It is apparent that the invention is very effective for implementation of a reduction in the size, weight and cost of the device.

FIG. 2 describes an auxiliary electrode which is not in contact with the discharge space. However, an auxiliary electrode can also be arranged within the bulb such that it comes into contact with the discharge space. In this case, for example the, following is done:

An output terminal (T31) of the ballast circuit (Bx) as shown in FIG. 1 must be switched, for example, by a switch, such as a relay or the like, and must be able to be connected either to the anode (E2) or the auxiliary electrode. In the case in which no bridging short circuit is found to exist in the gap between the electrodes (E1, E2) for the main discharge due to the mercury, the terminal (T31) is connected to the anode, while it is connected to the auxiliary electrode when a bridging short circuit caused by the mercury has been determined to be present, and thus a discharge is started.

When a discharge starts in the case in which the presence of a bridging short circuit caused by the mercury has been determined to exist and the terminal (T31) has been connected to the auxiliary electrode, the connection of the terminal (T31) can be switched to a connection to the electrode (E2) after a suitable waiting time and it can be ensured that the main discharge has been successfully started if the discharge continues unchanged. In the case of determining the bridging short circuit by the mercury when the connection of the terminal (T31) is switched to the connection to the electrode (E2), finally the main discharge can be started by repeating the above described sequence.

However, in this case, there must be a sufficient distance between the cathode (E1) and the auxiliary electrode so that bridging by the mercury does not take place.

The advantages of the invention were described above. The disadvantage of formation of a bridging short circuit in the gap between the electrodes of the discharge lamp by the mercury however occurs more frequently, the greater the amount of mercury to be added to the lamp and the shorter the distance between the electrodes becomes. The invention is especially effective in a light source device using a discharge lamp in which, for example, at least 0.15 mg of mercury per cubic millimeter volume of the discharge lamp is contained and in which the distance between the electrodes is at most 1.2 mm.

Here, with respect to the arrangement of the feed device for supplying the discharge current to the discharge lamp, a feed device for the discharge system is described in which a DC voltage is applied to the discharge lamp, and thus, a discharge is carried out as was described above using FIG. 1. The advantage of the invention, however, is completely developed in the same way in a feed device for a discharge lamp system in which an AC voltage is applied to the discharge lamp and thus a discharge is carried out.

Embodiments

Figure 3:
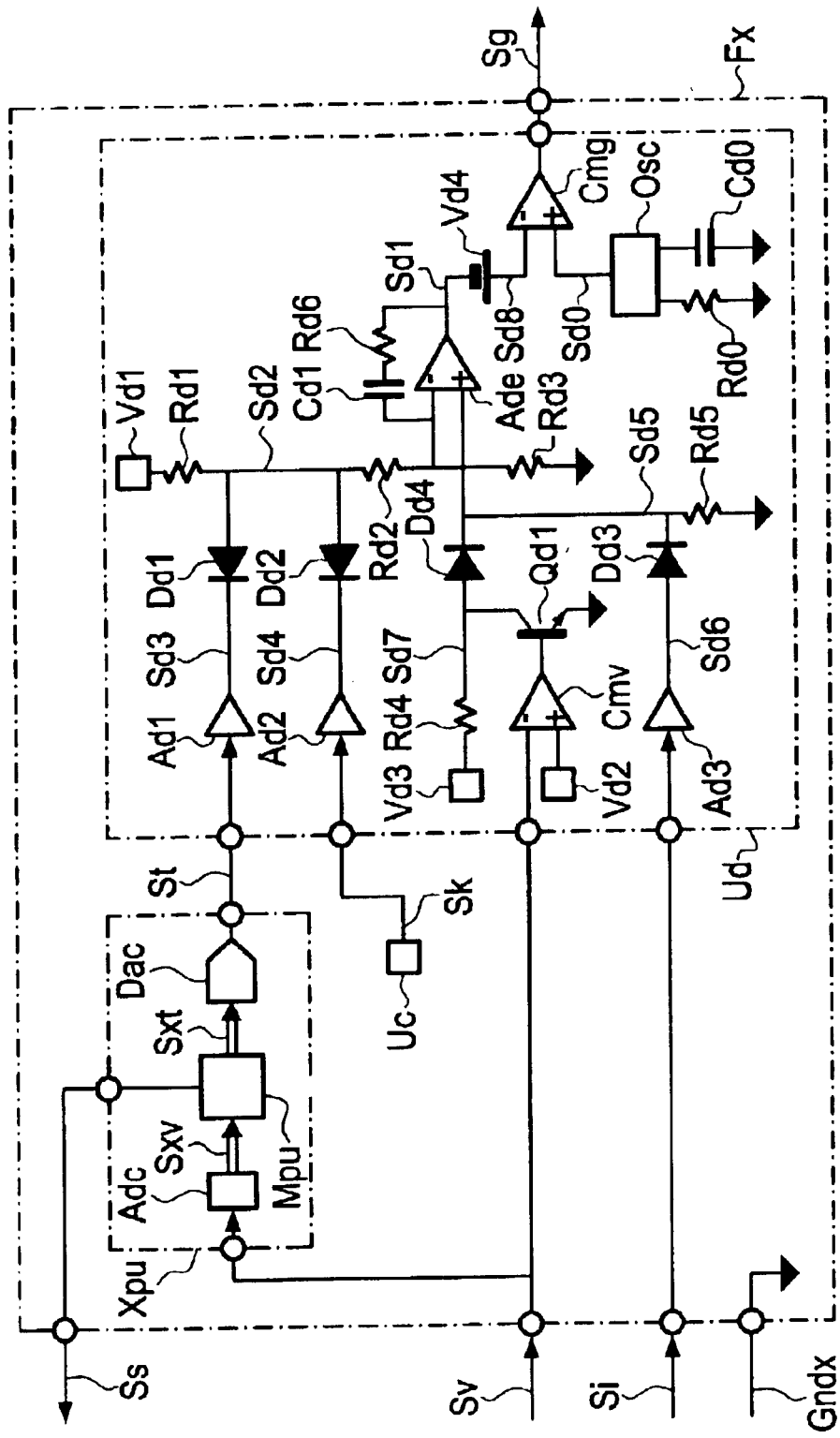
FIG. 3 shows a schematic of the arrangement of a feed device of the light source device in accordance with the arrangement of the invention shown in FIG. 1.

A first example according to the first aspect of the invention is shown in FIG. 3 using the arrangement of the feed control circuit (Fx) described above using FIG. 1 in a simplified representation. The lamp voltage signal (Sv) is input into an A/D converter (Adc) in an overall control element (Xpu), converted into digital lamp voltage data (Sxv) with a suitable place number, and input into a microprocessor unit (Mpu).

Here, the microprocessor unit (Mpu) comprises a CPU, a program storage, a data storage, a circuit for producing a clock pulse, a time counter, an IO controller for input and output of a digital signal and the like, and based on computations for which the lamp voltage data (Sxv) are taken as the reference, and based on the assessment of the conditions which correspond to the state of the system at this time, produces the required data for control of the chopper capacity (Sxt) for the chopper control circuit (Ud) described below. The required data for control of the chopper capacity (Sxt) are converted by a D/A converter (Dac) into analog setpoint signals (St) for control of the chopper capacity and are input into the chopper control circuit (Ud).

Furthermore, an upper limit signal (Sk) of the lamp current which is used to fix the allowable upper boundary value Ilmax of the lamp current (IL) is produced by a circuit (Uc) for producing the upper limit signal of the lamp current and is input into the chopper control circuit (Ud).

In the chopper control circuit (Ud), the setpoint signal (St) for controlling the chopper capacity is connected via an amplifier or a buffer (Ad1) which is installed if necessary and via a diode (Dd1), and furthermore, the upper limit signal (Sk) of the lamp current is connected via an amplifier or a buffer (Ad2) each of which is installed, if necessary, to one end of a "pull-up" resistor (Rd1), by which a setpoint signal (Sd2) for chopper driving is produced.

The other end of the "pull-up" resistor (Rd1) is connected to a reference voltage source (Vd1) with a suitable voltage. The setpoint signal (Sd2) for chopper driving is therefore a signal which is formed by the smaller signal of the following two signals being chosen, i.e. from one signal (Sd3) which corresponds to the setpoint signal (St) for control of the chopper capacity, and from one signal (Sd4) which corresponds to the above described upper limit signal (Sk) of the lamp current.

When the overall control element (Xpu), in some way, produces the setpoint signal (St) for controlling the chopper capacity, such as, for example, by division of a constant which corresponds to the rated wattage by the above described lamp voltage data (Sxv), by computing the value of the lamp current (IL) for achieving the rated wattage, by producing the setpoint signal (St) corresponding to this value, and by similar methods, even if this is unsuited, within the chopper control circuit (Ud), the setpoint signal (Sd2) for chopper driving is hardware-limited such that the lamp current (Il) does not exceed the upper limit signal (Sk) of the lamp current.

Control via the A/D converter (Adc) or the microprocessor unit (Mpu) specifically has a low operating speed (or the costs rise when the speed is increased). In the case in which, for example, a situation arises in which the discharge state of the lamp has changed quickly, therefore due to delay of operation unsuitability of the setpoint signal (St) for controlling the chopper capacity can occur. That such a current limitation function is installed in terms of hardware is also useful with respect to the protection of the lamp and the feed device.

On the other hand, the lamp current signal (Si) is connected via an amplifier or a buffer (Ad3) which is installed if necessary, and a diode to the other end of the "pull-down" resistor (Rd5); its one end is connected to ground (Gndx). In this way, the signal (Sd5) which is to be controlled is produced.

Furthermore, the lamp voltage signal (Sv) is compared by a comparator (Cmv) to the voltage of the reference voltage source (Vd2) which has a voltage which corresponds to the above described no-load voltage. When the lamp voltage signal (Sv) is higher than the no-load voltage, a transistor (Qd1) is shifted into the OFF state or active state. Because current is allowed to flow from a suitable voltage source (Vd3) via a resistor (Rd4) and a diode (Dd4) into the "pull-down" resistor (Rd5), the operation is carried out in such a way that the level of the signal (Sd5) to be controlled is increased.

Conversely, if the lamp voltage signal (Sv) is lower than the no-load voltage, the transistor (Qd1) is shifted into the ON state; this leads to a short circuit of the current from the voltage source (Vd3). The above described signal (Sd5) to be controlled thus corresponds to the lamp current signal (Si).

The reason for this is that for the above described circuit comprised of the "pull-down" resistor (Rd5), the diode (Dd3) and the diode (Dd4) a voltage is selected and is formed in the "pull-down" resistor (Rd5) which is selected according to the larger signal from the anode-side signals (Sd6) and (Sd7) of the respective diodes.

For the comparator (Cmv), by inserting positive feedback resistors (not shown in the drawings) into its output terminal and its noninverting input terminal, comparison operation can have hysteresis. In this way, an unintentional oscillation phenomenon can be prevented when the comparison output changes.

This arrangement quickly increases the above described signal (Sd5) to be controlled when the lamp voltage signal (Sv) tries to exceed the no-load voltage even if there is a state in which the output current roughly stops and in which the lamp current signal (Si) hardly occurs. In this way the lamp voltage (VL) is always limited by hardware essentially to less than or equal to the no-load voltage.

The setpoint signal (Sd2) for chopper driving is subjected to voltage division by a resistor (Rd2) and a resistor (Rd3) and is input into the inverting input terminal of an operational amplifier (Ade). On the other hand, the signal (Sd5) to be controlled is input into the noninverting input terminal of the operational amplifier (Ade). Since the output signal (Sd1) of the operational amplifier (Ade) is fedback via an integral capacitor (Cd1) and a speed increasing resistor (Rd6) to the inverting input terminal, the operational amplifier (Ade) acts as an error integration circuit which integrates the difference between the divided voltage of the setpoint signal (Sd2) for chopper driving by the resistor (Rd2) and the resistor (Rd3) and the voltage of the above described signal (Sd5) to be controlled.

Figure 4A:
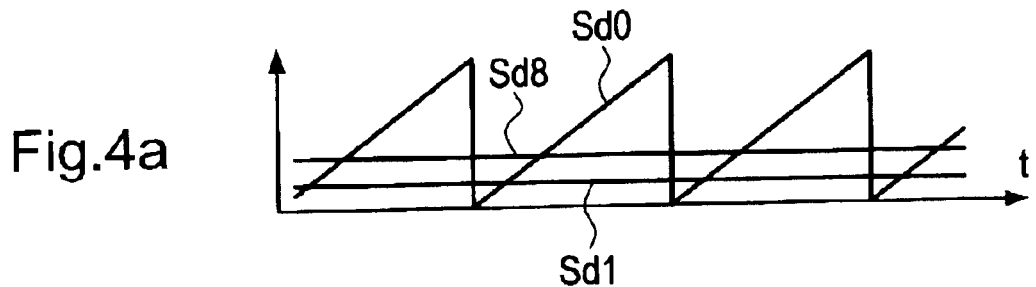
FIGS. 4A and 4B show the relation between an output signal of an error intergration circuit, a signal which is formed by a residual control deviation being input into it, a sawtooth wave signal and a gate driver signal for use in describing the operation of a feed device of the light source device of the invention shown in FIG. 1.

An oscillator Osc, in which a resistor (Rd0) for determining the time constant and a capacitor (Cd0) are connected to one another, produces the sawtooth wave signal which is shown in FIG. 4A. This sawtooth wave signal (Sd0) and the output signal (Sd1) of the error integration circuit are compared to one another by a comparator (Cmg).

During comparison, a signal (Sd8) is compared to the sawtooth wave signal (Sd0), the signal (Sd8) being formed by the offset voltage (Vd4) being added to the output signal (Sd1) of the error integration circuit.

During the interval during which the voltage of the sawtooth wave signal (Sd0) higher than the voltage of the signal (Sd8), the gate driver signal (Sg) which reaches a high level is produced and output by the chopper control circuit (Ud).

As was described above, the signal (Sd8) is formed by a residual control deviation being input into the output signal (Sd1) of the error integration circuit. The pulse duty factor of the gate driver signal (Sg) is therefore provided such that it is less than or equal to a certain maximum value which is less than 100%, i.e., that it is less than or equal to the maximum pulse duty factor Dxmax even if it is assumed that the output signal (Sd1) of the error integration circuit is 0.

Figure 4B:
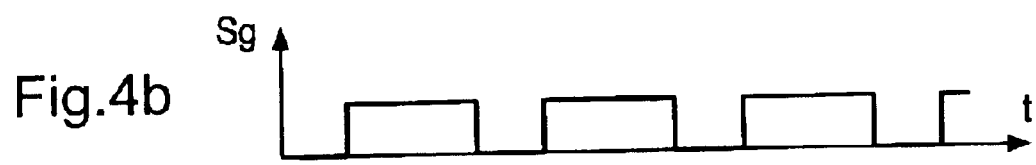

FIGS. 4A and 4B show the relation between the output signal (Sd1) of the error integration circuit, the signal (Sd8) which is formed by a residual control deviation being input into it, the sawtooth wave signal (Sd0) and the gate driver signal (Sg).

The gate driver signal (Sg) which was output by the feed control circuit (Fx) is input into the gate driver circuit (Gx). As a result, a feedback control system is completed in which the lamp current signal (Si) and the lamp voltage signal (Sv) are fedback with operation of the switching device (Qx).

For the arrangement of the chopper control circuit (Ud) described above using FIG. 3, a TL494 from Texas Instruments and the like can be used as a commercial integrated circuit in which the operational amplifier (Ade), the oscillator (Osc), the comparator (Cmg) and the like are integrated.

In this light source device, in the case in which the mercury causes a bridging short circuit in the gap between the electrodes (E1, E2) of the discharge lamp (Ld), when the microprocessor unit (Mpu) produces a suitable value of the setpoint signal (St) for controlling the chopper capacity and by operation of the switching part which is compared and monitored by the comparator (Cmv), and tries to output the no-load voltage, the lamp voltage (VL) does not increase, but it is maintained at roughly 0 V. The lamp voltage signal (Sv) therefore cannot reach the setpoint and remains at a low level.

However, since, as was described above, a value is fixed which corresponds to the upper boundary value Ilmax of the lamp current (IL) which is allowed by the circuit (Uc) for producing the upper limit signal of the lamp current, damage to the feed device (Ex) in this state due to a current which exceeds a certain value is prevented, because feedback-control is exercised such that exceeding the upper boundary value Ilmax is prevented by the lamp current (IL) when this is attempted.

The microprocessor unit (Mpu) monitors the lamp voltage signal (Sv) by the A/D converter (Adc). It is programmed such that, in the case of determining that the lamp voltage signal (Sv) shows only a low voltage which corresponds to the short circuit between the electrodes (E1, E2), it sends a bridging short circuit determination signal (Ss) in the sense that a bridging short circuit in the gap between the electrodes (E1, E2) of the discharge lamp (Ld) caused by the mercury has been determined to exist.

The light source device in the first embodiment, in this way, determines the bridging short circuit in the gap between the electrodes (E1, E2) of the discharge lamp (Ld) caused by the mercury and can represent this circumstance by sending the bridging short circuit determination signal (Ss).

Figure 5:
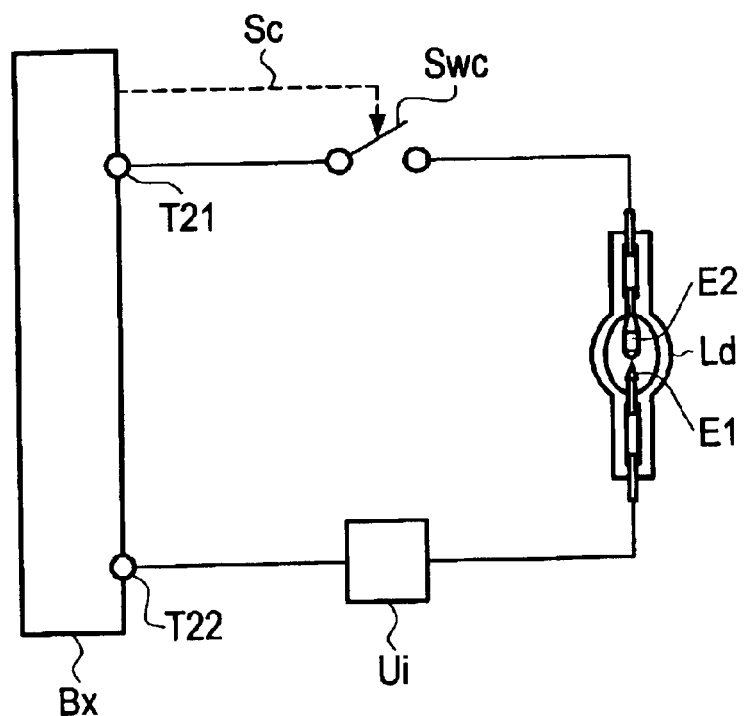
FIG. 5 is a schematic of one embodiment of a development of the light source device of the invention shown in FIG. 1.

If the intention is to enable the fact that, as the phenomenon that the lamp voltage signal (Sv) shows only a value which corresponds to the low lamp voltage (VL), the above described phenomenon of a bridging short circuit in the gap between the electrodes (E1, E2) of the discharge lamp (Ld) caused by mercury differs from the phenomenon by other factors, such as, for example, the phenomenon of the short circuit of the smoothing capacitor (Cx) or the like, the following is done as is described in a second embodiment shown in FIG. 5:

A switching device (Swc) is connected in series to the current line of the lamp. When a phenomenon which is possibly the phenomenon of a bridging short circuit due to mercury is determined to exist, the microprocessor unit (Mpu) outputs an output interruption signal (Sc), opens the switching device (Swc) and again executes an attempt to output the no-load voltage. If this has been successfully done, processing is performed such that the bridging short circuit in the gap between the electrodes (E1, E2) of the discharge lamp (Ld) caused by the mercury has been determined beyond a doubt. In the case in which the repeated output of the no-load voltage even in the opened state of the switching device (Swc) has no success, it can be processed as (some other) fault.

Figure 6:
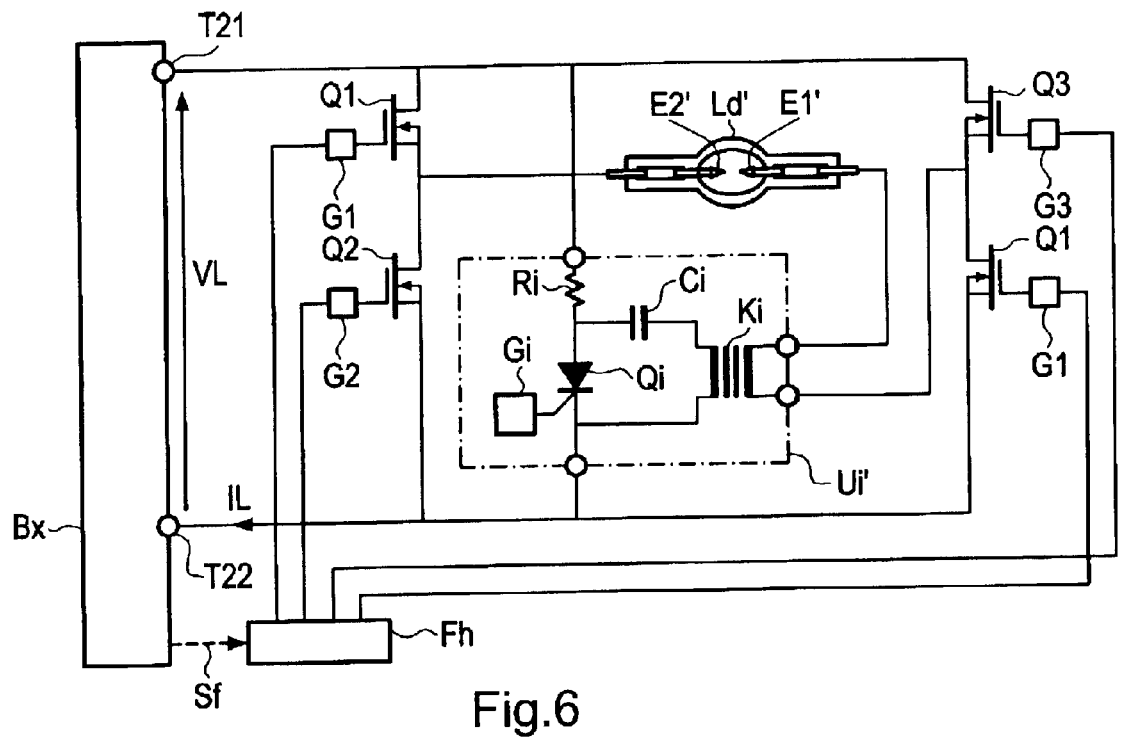
FIG. 6 is a schematic of another embodiment of a development of the light source device of the invention shown in FIG. 1.

On the other hand, FIG. 6 shows a third embodiment in a simplified representation in which a feed device for a discharge system, in which an AC voltage is applied to the discharge lamp and thus a discharge is carried out, was formed in that, downstream of the ballast circuit (Bx) in the feed device described using FIG. 1 for a discharge system in which a DC voltage is applied to the discharge lamp and thus a discharge is carried out, there is additionally a full bridge inverter for inverting the polarity.

Normally, two states are repeated in alternation, specifically a state in which only the switching devices (Q1) and (Q4) are closed, for example, by a FET or the like, and the state in which only the switching devices (Q2) and (Q3) are closed. Here, between the two above described states a short time interval is inserted in which for example not a single switching device is closed so that the switching devices (Q1)

and (Q2) are not closed at the same time with the switching devices (Q3) and (Q4). Such a control of the respective switching device is carried out based on a signal from the inverter control circuit (Fh) via gate driver circuits (G1, G2, G3, G4) which are assigned to the respective switching devices.

In the case of a light source device with such a full bridge inverter, the microprocessor unit (Mpu) can try again to output the no-load voltage in the following manner when distinguishing the above described phenomenon of the bridging short circuit in the gap between the electrodes (E1', E2') of the discharge lamp (Ld') caused by the mercury from the phenomenon due to other factors instead of the operation described in the above described embodiment as shown in FIG. 5 and in which, by opening the switching device (Swc), an attempt to output the no-load voltage is carried out once again.

The microprocessor unit (Mpu) outputs an inverter stop signal (Sf), switches the operation of the inverter control circuit (Fh) and shifts all switching devices (Q1, Q2, Q3, Q4) into the nonclosed state, a state in which only the switching devices (Q1) and (Q3) are closed, or a state in which only the switching devices (Q2) and (Q4) are closed.

In the case in which, in this way, without the switching device (Swc) described above using FIG. 5, the no-load voltage has been successfully output again, processing can be done such that the bridging short circuit of the gap between the electrodes (E1', E2') of the discharge lamp (Ld') caused by the mercury has been determined with certainty.

Figure 7:
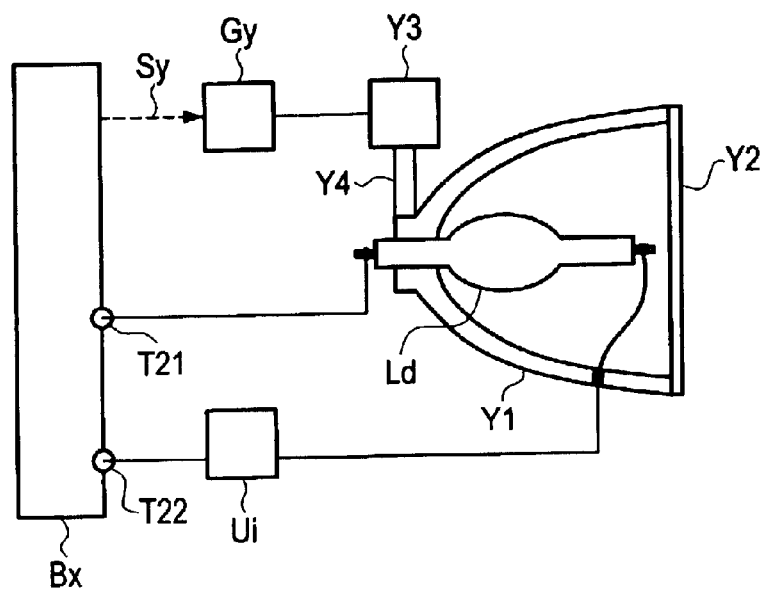
FIG. 7 is a schematic of another embodiment of the invention.

FIG. 7 shows a fourth embodiment of the invention in a simplified representation. In FIG. 7, the discharge lamp (Ld) with a reflector (Y1) for the emergence of lamp emission in a certain direction and with a light exit window (Y2) which covers the front of the reflector (Y1) is formed in one piece.

Here, there are additionally a vibration generating part or an impact generating part (Y3) as a means for eliminating the above described bridging short circuit in the gap between the electrodes (E1, E2) of the discharge lamp (Ld) caused by the mercury and a coupling part (Y4) which is used to transmit the vibration or the impact to the reflector (Y1).

For example, if a bridging short circuit in the gap between the electrodes (E1, E2) of the discharge lamp (Ld) has been determined by the arrangement of the feed device in accordance with the invention in the above described first to third embodiments, the microprocessor unit (Mpu) of the driver circuit (Gy) for driving the vibration generating part or the impact generating part (Y3) sends the activation signal (Sy), which activates it and operates the vibration generating part or impact generating part (Y3).

The vibration generating part can be an ultrasonic vibrator or a small vibrator (vibration device) which is used for a portable telephone or the like. A solenoid or the like can be used as the impact generating part.

By means of this arrangement of the light source device, as was described in the advantages of the invention, the mercury which in the gap between the electrodes (E1, E2) of the discharge lamp (Ld) has produced the bridging short circuit can be shaken out, moved, and thus, the bridging short circuit in the gap between the electrodes (E1, E2) of the discharge lamp (Ld) can be eliminated.

Figure 8:
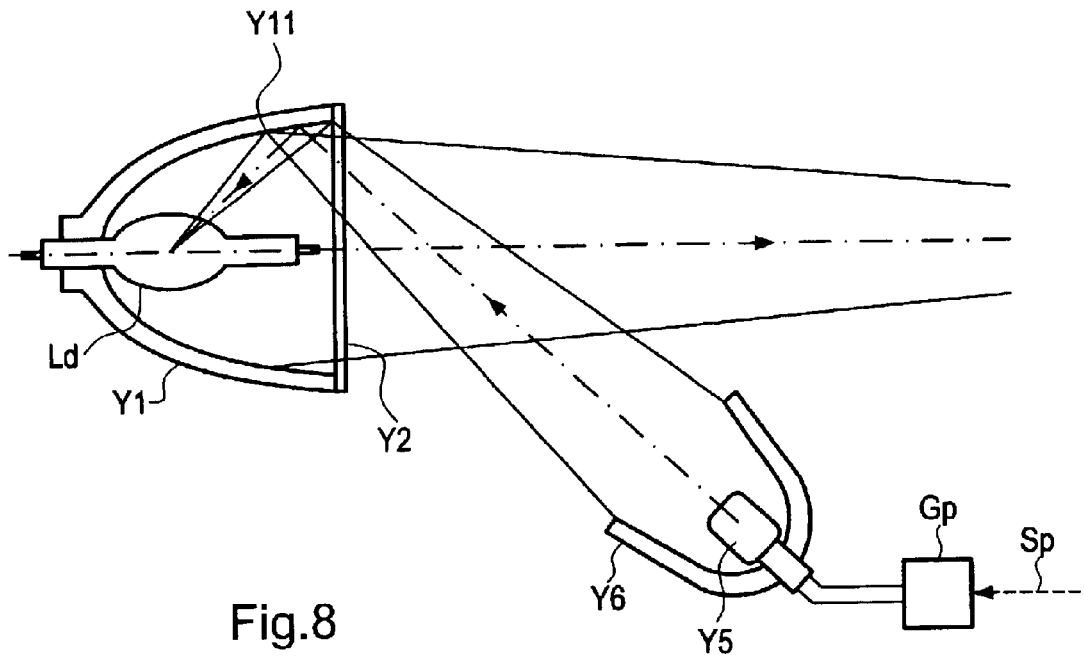
FIG. 8 is a schematic of a further embodiment of the invention.

FIG. 8 shows a fifth embodiment of the invention in a simplified representation. In FIG. 8, the discharge lamp (Ld) with a reflector (Y1) for the emergence of lamp emission in a certain direction and with a light exit window (Y2) which covers the front of the reflector (Y1) is formed in one piece.

Here, there is additionally a heating lamp (Y5) which is a heating means as a means for eliminating the bridging short circuit in the gap between the electrodes (E1, E2) and for which, for example, a halide lamp or the like can be used.

It is desirable for the light from the heating lamp (Y5) to be focused by the arrangement of the reflector (Y6) or the like and for the efficiency of heating to be thus increased. Furthermore, it is desirable for the heating lamp (Y5) and the reflector (Y6) to be arranged such that the light flux emitted from the discharge lamp (Ld) is not hindered.

FIG. 8 shows a case in which the reflection surface of the reflector (Y1) is provided with a flat part (Y11) so that, for example, the projection onto the surface which is perpendicular to the optical axis becomes rectangular for the reflector (Y1) for the discharge lamp (Ld). Using the flat part (Y11) of this reflection surface, the light of the heating lamp (Y5) is emitted onto the discharge lamp (Ld), by which the heating lamp (Y5) is skillfully heated.

Since the flat part (Y11) of the reflection surface of the reflector (Y1) does not contribute to the emergence of emission from the discharge lamp (Ld) in a certain direction, the above described flat part (Y11) can be provided with an opening and the light of the heating lamp (Y5) emitted from there can also be emitted onto the discharge lamp (Ld).

For example, if the bridging short circuit in the gap between the electrodes (E1, E2) of the discharge lamp (Ld) has been determined to have occurred by the arrangement of the feed device of the invention in the above described first to third embodiments, the microprocessor unit (Mpu) of the power source (Gp) for the heating lamp which is used to supply current to the heating lamp (Y5) sends an activation signal (Sp), activates it and thus initiates the function of the heating lamp (Y5).

By means of this arrangement of the light source device, as was described in the advantage of the invention, the mercury which in the gap between the electrodes (E1, E2) of the discharge lamp (Ld) has produced the bridging short circuit can be vaporized, and thus the bridging short circuit in the gap between the electrodes (E1, E2) of the discharge lamp (Ld) can be eliminated.

Furthermore, the heating lamp (Y5), besides the function of heating of the discharge lamp (Ld), also has the function of facilitating the starting of the discharge lamp (Ld) by the ionization action of the photons, which are contained in its emission spectrum and which have a relatively high energy, on the gas in the discharge space of the discharge lamp (Ld) and consequently the function of reducing the voltage which the starter must produce.

Figure 9:
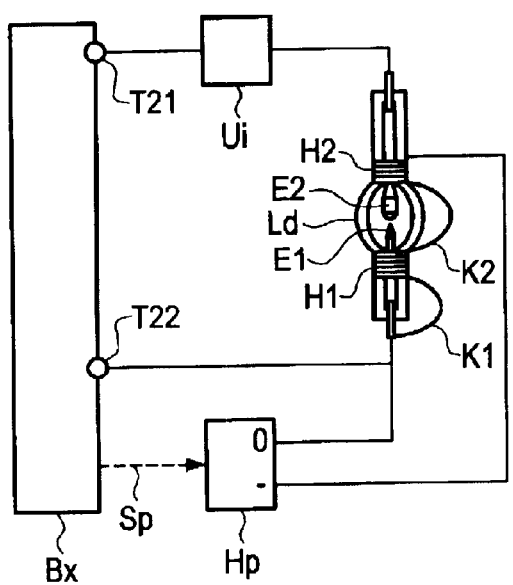
FIG. 9 is a schematic of still another embodiment of the invention.

FIG. 9 shows a sixth embodiment of the invention in a simplified representation. Here, the invention described in the application documents of Japanese patent application 2000-075434 and Japanese patent application 2000-335804 (see also US-2002-0047610-A1 and EP 1134784 A2 which claim the priorities of the Japanese applications) are used. The teachings of all these documents are incorporated herein by reference.

In this case, there is an arrangement in which an area of the bulb of the discharge lamp (Ld) which does not prevent light emergence, for example, the sealing area, is provided with heater parts (H1, H2) which are wound with conductive wires, in which a current is supplied to them via connecting lines (K1, K2) by conductive wires, which are installed if necessary, from a power source (Hp) for a heater and in which the function as a heating means as a means for eliminating the bridging short circuit of the gap between the electrodes (E1, E2) of the discharge lamp (Ld) by the mercury is obtained.

For example, if the bridging short circuit in the gap between the electrodes (E1, E2) of the discharge lamp (Ld)

by the mercury has been determined to exist by the arrangement of the feed device of the above described embodiments, the microprocessor unit (Mpu) of the power source (Hp) sends an activation signal (Sh) to a heater which activates it, and thus, initiates the function of the heater parts (H1, H2).

By means of this arrangement of the light source device, as was described in the advantages of the invention, the mercury which in the gap between the electrodes (E1, E2) of the discharge lamp (Ld) has produced the bridging short circuit can be vaporized, and thus the bridging short circuit in the gap between the electrodes (E1, E2) of the discharge lamp (Ld) can be eliminated.

FIG. 2 which also was cited in the description of the advantages of the invention is a simplified representation of the sixth embodiment of the invention. With respect to the arrangement of the auxiliary electrode feed circuit (Ue), for example, a case is described in which a circuit is used which is called a fly-back inverter.

In the auxiliary electrode feed circuit (Ue), a current is intermittently supplied to a primary winding (Pe) of a transformer (Ke) which is connected to the positive terminal of the DC source (Mx) by a switching device (Qe) such as a FET or the like which is driven by a gate driver circuit (Ge). The energy stored in the interval during which the switching device (Qe) is in the ON state in the transformer (Ke) is released in a secondary winding (He) of the transformer (Ke) when the switching device (Qe) is shifted into the OFF state. Thus a high voltage is generated in the secondary winding (He).

The high voltage generated in the secondary winding (He) of the transformer (Ke) is applied between the electrode (E1) of the discharge lamp (Ld) for the main discharge and the auxiliary electrode (Et). Therefore, as was described in the description of the advantages of the invention, a dielectric barrier discharge can be produced in the discharge space within the discharge lamp (Ld) and heating can be done.

For example, if the bridging short circuit in the gap between the electrodes (E1, E2) of the discharge lamp (Ld) caused by the mercury has been determined to have been produced, by the arrangement of the feed device of the first to third embodiments of the invention, the microprocessor unit (Mpu) activates the gate signal generating circuit (Osb) which produces an intermittent or essentially periodic gate driver signal (Sb) for operation of the gate driver circuit (Ge), and produces the dielectric barrier discharge.

By means of this arrangement of the light source device, as was described in the advantage of the invention, the mercury which in the gap between the electrodes (E1, E2) of the discharge lamp (Ld) has produced the bridging short circuit can be vaporized, and thus the bridging short circuit in the gap between the electrodes (E1, E2) of the discharge lamp (Ld) can be eliminated.

Here, an auxiliary electrode feed circuit (Ue) was shown in which a fly-back inverter is used. However, one with a different system can also be used when a pulse series or alternating high voltage can be produced.

Furthermore, implementation can also be achieved in the same circuit as the starter (Ui) shown in FIG. 1. But since very frequent operation must be done for heating, the inverter is however more suited.

Figure 10:
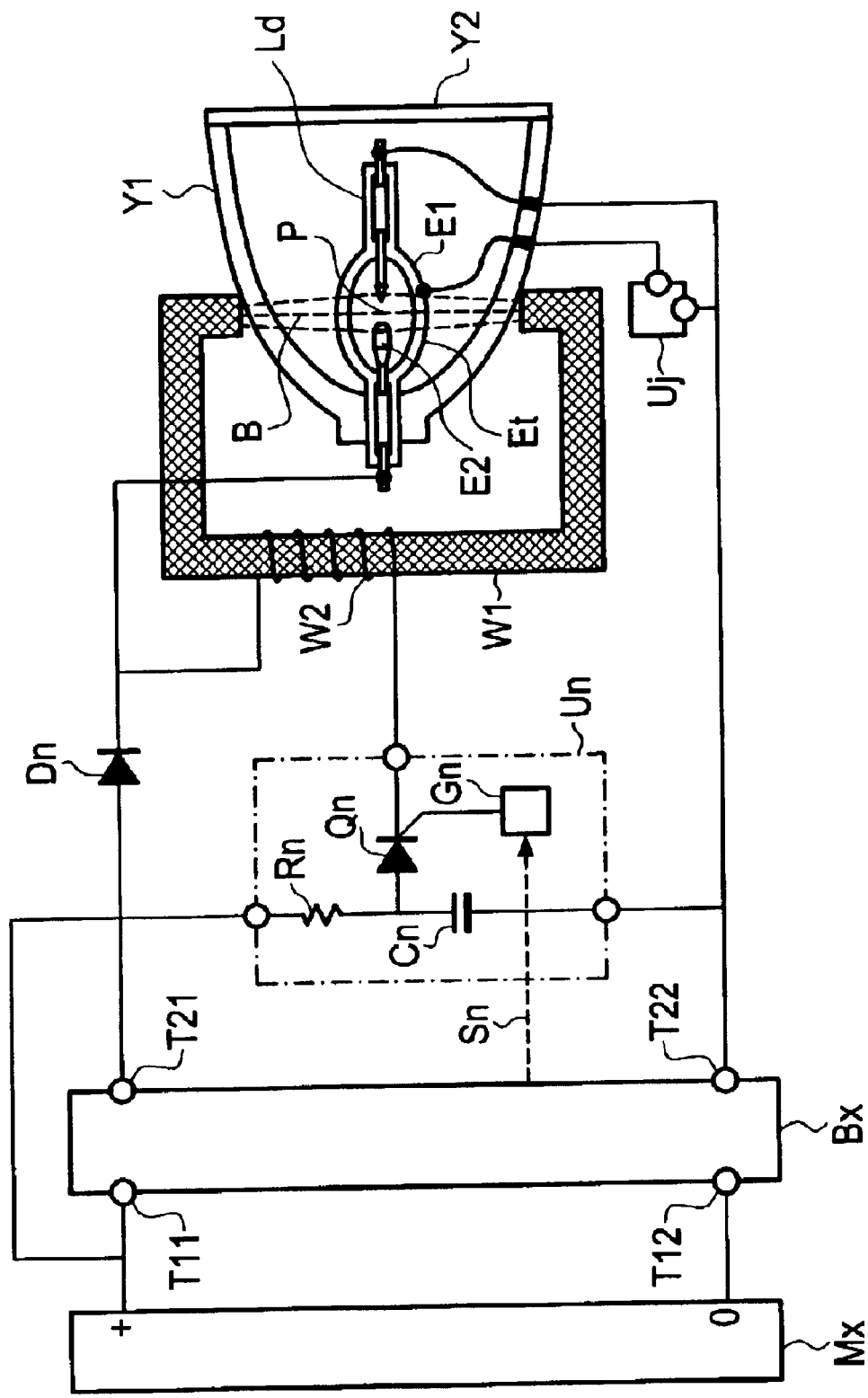
FIG. 10 is a schematic of yet another embodiment of the invention.

FIG. 10 shows a seventh embodiment of the invention in a simplified representation in which the means for eliminating the bridging short circuit is a means in which a Lorentz force is used. In FIG. 10, the discharge lamp (Ld) with a reflector (Y1) for emergence of the lamp emission in a certain direction and with a light exit window (Y2) which covers the front of the reflector (Y1) is formed in one piece.

A magnet core (W1) of magnetic material, such as ferrite or the like, is wound with a field coil (W2). By feeding the current to the latter, a magnetic field (B) is applied to the gap (P) between the electrodes (E1, E2) as the two poles of the discharge lamp (Ld) in the direction essentially perpendicular to one of the axes of the electrodes.

In a driver circuit (Un), a capacitor (Cn) is charged via a resistor (Rn). When a switching device (Qn), such as a thyristor or the like, is activated by a gate driver circuit (Gn), current is supplied to the field coil (W2), and at the same time, a pulse current can be supplied to the gap (P) between the electrodes of the discharge lamp (Ld).

For example, if a bridging short circuit in the gap between the electrodes (E1, E2) of the discharge lamp (Ld) caused by the mercury has been determined to exist by the arrangement of the feed device according to the first to third embodiments, the microprocessor unit (Mpu) produces the gate driver signal (Sn) for operation of the gate driver circuit (Gn).

By means of this arrangement of the light source device, a pulsed current is supplied to the mercury which has produced the bridging short circuit, and at the same time, a pulse-like magnetic field (B) is applied in the direction which is essentially perpendicular to the pulsed current in the mercury. In the mercury which has produced the bridging short circuit, a pulse-like Lorentz force therefore acts in a direction which is perpendicular both to the flow direction within the mercury and also to the direction of the magnetic field (in the direction perpendicular to the page of the drawings in FIG. 10). As a result, the mercury bursts out in the direction which is essentially perpendicular to the axes of the electrodes, by which the bridging short circuit can be eliminated.

In this embodiment, the field coil (W2) and the discharge lamp (Ld) are connected in series and the same current is delivered using a single driver feed circuit (Un). However, it can also be connected in parallel or there can be a respective driver feed circuit for each of the field coil (W2) and the discharge lamp (Ld).

In this embodiment, an electromagnet with a magnetic core (W1) and a field coil (W2) can be used as the means for producing the magnetic field (B). However, a permanent magnet or an electromagnet together with a permanent magnet can also be used.

In the representation of this embodiment, a high voltage is applied to the auxiliary electrode (Et) by a starter (Uj). However, the details of the starter type are unimportant to the advantages of the invention. Therefore the type described in FIG. 1 can be used, in which a high voltage is applied in series to the discharge lamp.

Here, simply the necessary minimum of the circuit is described in order to explain operation, the function or the action of the light source device as claimed in the invention. However, the other details of the circuit operation described in the embodiments, for example, the polarity of the signals, the specific choice, the specific addition and omission of switching devices or concepts such as the changes and the like due to facilitation of procurement of component and for economic reasons can be easily carried out in the practice of building the device.

It is assumed that, especially a device for protection of switching devices of a feed device, for example, switching devices such as a FET or the like, against damage factors, such as a wattage exceeding a certain value, a current exceeding a certain value, overheating and the like, or a device which reduces the formation of radiant noise and line noise which forms according to the operation of the switching devices of the feed devices, or which prevents release of the resulting noise to the outside, such as, for example, a snubber circuit, a varistor, a clamping diode (including the "pulse-by-pulse" method), a current limiter circuit, a noise filter choke with a common mode or normal mode, a noise filter capacitor and the like, if necessary, can be added to the respective part of the circuits which are described in the embodiments.

The arrangement of the light source device according to the invention is not limited to the circuit type described in the embodiments described in these application documents.

The device in accordance with the invention for determining the bridging short circuit due to mercury is furthermore not limited to the device described in the application documents, but a device for determining the bridging short circuit which is suited for switching the lamp used and the feed device used and the corresponding principle for determining the bridging short circuit can be used as, for example, a device in which the ratio of the lamp voltage signal (Sv) to the lamp current signal (Si), i.e., the ratio of the lamp voltage (VL) to the lamp current (IL) is computed, and in which, based on the value of the electrical resistance which the lamp indicates, the presence or absence of formation of a bridging short circuit is assessed.

In the embodiments, cases are described in which the assessment of the existence of the bridging short circuit and sequence control such as starting of the means for eliminating the bridging short circuit or the like are carried out by the microprocessor unit (Mpu). The action of the invention is however also advantageously developed in a complex arrangement of the light source device or simplification such that the microprocessor unit (Mpu) is done away with and instead of the latter, a simpler control circuit is used.

The means for eliminating the bridging short circuit is not limited to the means described in the application documents, but can also supply a pulsed current from a capacitor which has stored an electrical charge, such as, for example, the driver feed circuit (Un) shown in FIG. 10, via a switching device such as a thyristor or the like, to the mercury which has produced the bridging short circuit, can quickly heat up the mercury and allow it to wash out.

Action of the Invention

According to the invention, the following disadvantage in the prior art can be eliminated:

in a light source device with a mercury lamp, in the case of a bridging short circuit of the gap between the electrodes of the discharge lamp caused by mercury, the light source device can no longer be used because the difference from a defect in the device cannot be ascertained.

What we claim is:

1. Light source device in which the following are connected to one another:

a discharge lamp in which two electrodes are arranged opposite one another in a discharge space separated by a gap; and a feed device for supplying a discharge current to the electrodes; and a means for determining whether a bridging short circuit has formed in the gap between the electrodes by mercury condensed on the electrodes.

2. Light source device as claimed in claim 1, further comprising a means for indicating the formation of said bridging short circuit in response to the forming thereof being determined by said means for determining.

3. Light source device as claimed in claim 1, further comprising a means for eliminating the bridging short circuit in response to the forming thereof being determined by said means for determining.

4. Light source device as claimed in claim 2, further comprising a means for eliminating the bridging short circuit in response to the forming thereof being determined by said means for determining.

5. Light source device as claimed in claim 3, wherein the means for eliminating the bridging short circuit is a means for applying vibration to the discharge lamp.

6. Light source device as claimed in claim 5, wherein the means for applying vibration to the discharge lamp is a device from the group consisting of an ultrasonic vibration device, a vibration device and a solenoid device.

7. Light source device as claimed in claim 3, wherein the means for eliminating the bridging short circuit comprises a means for at least partially heating the discharge lamp.

8. Light source device as claimed in claim 7, wherein the means for eliminating the bridging short circuit is a heating lamp.

9. Light source device as claimed in claim 8, wherein the heating lamp is arranged for directing radiation emitted therefrom onto a reflector which surrounds the discharge lamp and is reflected from the reflector into an area of the gap between the electrodes.

10. Light source device as claimed in claim 9, wherein the heating lamp is arranged such that its radiation is emitted onto a flattened area of the reflector which is adjacent to the reflector opening.

11. Light source device as claimed in claim 3, wherein the means for eliminating the bridging short circuit comprises an auxiliary electrode and means for forming a discharge between the auxiliary electrode and one of the electrodes of the discharge lamp.

12. Light source device as claimed in claim 11, wherein the auxiliary electrode is located outside of the discharge space.

13. Light source device as claimed in claim 3, wherein the means for eliminating the bridging short circuit comprises a magnet in order to produce a Lorentz force in the gap between the electrodes.

14. Light source device as claimed in claim 13, wherein the magnet comprises a magnet core of magnetic material which is wound with a field coil, in order to produce a magnetic field in the gap between the electrodes with a direction essentially perpendicular to an axis which joins the electrodes by supplying current to the magnet.

* * * * *